J. F. VAN DER VELDE.
MEANS FOR ATTACHING ROCK DRILLING MACHINES TO THEIR FEEDING DEVICES.
APPLICATION FILED MAR. 5, 1913.
1,181,701. Patented May 2, 1916.
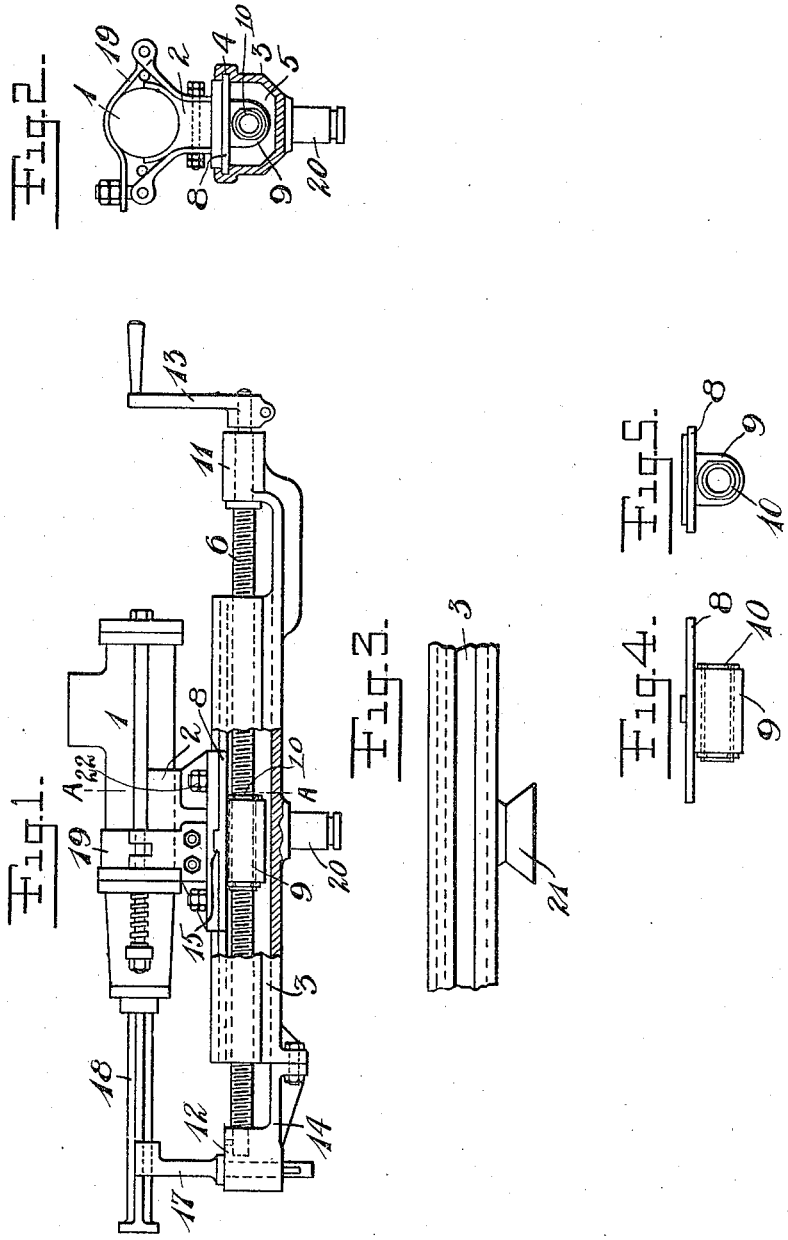
Witnesses:
Inventor
JOHN F. VAN DER VELDE
By his Attorney

UNITED STATES PATENT OFFICE.

JOHN FREDERICK VAN DER VELDE, OF JEPPESTOWN, JOHANNESBURG, TRANSVAAL, SOUTH AFRICA.

MEANS FOR ATTACHING ROCK-DRILLING MACHINES TO THEIR FEEDING DEVICES.

1,181,701.      Specification of Letters Patent.      Patented May 2, 1916.

Application filed March 5, 1913. Serial No. 752,244.

*To all whom it may concern:*

Be it known that I, JOHN FREDERICK VAN DER VELDE, a citizen of the United States of America, residing at corner of Main and Browning streets, Jeppestown, Johannesburg, in the Province of the Transvaal, Union of South Africa, have invented new and useful Improvements in Means for Attaching Rock-Drilling Machines to Their Feeding Devices, of which the following is a specification.

The present invention relates to improvements in rock drilling machine cradles and in the means for attaching the machine to the same.

A particular object of the invention is to provide a renewable part, between the cylinder of the machine, and the cradle and feeding means, which part may be replaced when worn without necessitating replacement of the machine cylinder.

In the accompanying drawings: Figure 1 is a side elevation of the machine and cradle partly in section. Fig. 2 is a section on the line A—A, Fig. 1. Fig. 3 is a side elevation of a part of a modified form of cradle. Figs. 4 and 5 are, respectively, side and end views of the slipper with renewable nut therein.

According to this invention, the cylinder 1 of the rock drilling machine has a bracket 2 fastened to it (see Fig. 1), or formed on it (see Fig. 5). The cradle of the machine comprises a frame 3 provided with guideways 4 parallel and opposite to one another and a channel 5 between them for affording a passage-way for the feed screw 6 and nut 7. In guide-ways 4 is placed a slipper 8 provided with a projection 9 which may be threaded to form the nut 7 or bored out to carry a detachable nut 10. Slipper 8 is secured to the bracket 2 by such means as bolts 22.

The feed screw 6 is supported in bearings 11, 12 placed one at each end of frame 3. At the rear end it is provided with the usual crank handle 13. At the front end of the frame 3 a bracket 14 is attached to provide bearing 12. Bracket 14 is made detachable from frame 3 to allow nut 7 to be passed onto screw 6.

For keeping the drilling machine in line with the cradle there may be provided between bracket 2 and slipper 8 a projection 15 on the one fitting into a recess 16 in the other and to assist in maintaining such alinement and in order to lessen the wear on slipper 8 in the guides 4, there may be provided a support 17 for the drilling tool 18.

By the use of this invention a drill cylinder unprovided with means for attaching it to a cradle, *e. g.* the cylinder of some forms of hammer drills, may be attached to the cradle by providing a clamp 19 carrying the bracket 2 and taking onto the outside of the rock drill cylinder.

The cradle frame 3 may be provided with means such as the pin 20 or mushroom 21 (Fig. 3) for attaching it to a stopping bar or other support.

It will be understood that this invention provides a ready means of remedying a defect in a machine due to wear or breakage of any particular part, by the simple replacement of the part required, thus allowing all parts to be kept in use until broken or worn out.

What I claim, and desire to secure by Letters Patent is:—

1. In combination with a rock drilling machine and a cradle therefor, a bracket on the machine, a slipper renewably attached to said bracket, guide-ways in the cradle in which said slipper works, a feed screw on said cradle and a nut associated with said slipper and working on said feed screw.

2. In combination with a rock drilling machine and a cradle therefor, a bracket detachably secured to said machine, a slipper renewably attached to said bracket, guide-ways in the cradle in which said slipper works, a feed screw associated with said cradle, and a nut detachably secured to said slipper and working on said feed screw.

In testimony whereof, I have signed my name to this specification in the presence of two subscribing witnesses.

JOHN FREDERICK VAN DER VELDE.

Witnesses:
    WESLEY E. JOHN,
    JOHN ERNEST HYSLOP.

Copies of this patent may be obtained for five cents each, by addressing the "Commissioner of Patents, Washington, D. C."